United States Patent
Xu et al.

(10) Patent No.: US 8,880,584 B2
(45) Date of Patent: Nov. 4, 2014

(54) DATA TRANSFERRING METHOD AND OBJECT TRACKING SYSTEM USING THE SAME

(75) Inventors: Jichuan Xu, Beijing (CN); Yi He, Beijing (CN)

(73) Assignee: Honeywell International, Inc., Morristown, NJ (US)

( * ) Notice: Subject to any disclaimer, the term of this patent is extended or adjusted under 35 U.S.C. 154(b) by 1565 days.

(21) Appl. No.: 11/952,838

(22) Filed: Dec. 7, 2007

(65) Prior Publication Data

US 2009/0150478 A1    Jun. 11, 2009

(51) Int. Cl.
| G06F 15/16 | (2006.01) |
| G06F 15/173 | (2006.01) |
| G06Q 10/10 | (2012.01) |

(52) U.S. Cl.
CPC ..................................... *G06Q 10/10* (2013.01)
USPC ........................................... 709/203; 709/224

(58) Field of Classification Search
None
See application file for complete search history.

(56) References Cited

U.S. PATENT DOCUMENTS

| 5,987,432 | A | 11/1999 | Zusman et al. |
| 6,131,067 | A * | 10/2000 | Girerd et al. ................... 701/213 |
| 6,147,687 | A | 11/2000 | Wanderski |
| 6,509,830 | B1 * | 1/2003 | Elliott ....................... 340/286.02 |
| 6,535,878 | B1 * | 3/2003 | Guedalia et al. ....................... 1/1 |
| 6,677,858 | B1 * | 1/2004 | Faris et al. .................. 340/573.1 |
| 6,724,309 | B2 * | 4/2004 | Grose et al. ................. 340/572.1 |
| 6,965,827 | B1 * | 11/2005 | Wolfson ......................... 701/207 |
| 7,000,008 | B2 | 2/2006 | Bautista-Lloyd et al. |
| 7,327,258 | B2 * | 2/2008 | Fast et al. .................... 340/572.1 |
| 2002/0135616 | A1 | 9/2002 | Meaden |
| 2003/0060212 | A1 * | 3/2003 | Thomas ......................... 455/456 |
| 2003/0115186 | A1 | 6/2003 | Wilkinson et al. |
| 2003/0200255 | A1 | 10/2003 | Vallone |
| 2004/0162875 | A1 * | 8/2004 | Brown .......................... 709/203 |
| 2006/0047780 | A1 | 3/2006 | Patnude |

* cited by examiner

*Primary Examiner* — Krista Zele
*Assistant Examiner* — Matthew Lindsey
(74) *Attorney, Agent, or Firm* — Husch Blackwell LLP

(57) ABSTRACT

A data transferring system and an object tracking system. The data transferring method includes generating messages based on the data, connecting the clients to the server, generating a plurality of event trigger thread instances, each of the instances being in communication with a corresponding one of the clients and sending the messages from the server to the clients through remote events by using the corresponding event trigger thread instance to control the communication between the server and the client.

6 Claims, 7 Drawing Sheets

DATA TRANSFERRING METHOD AND OBJECT TRACKING SYSTEM USING THE SAME

BACKGROUND OF THE INVENTION

1. Field of the Invention

The present invention generally relates to a data transferring method, and an object tracking system using the same. More particularly, this invention relates to a data transferring method for efficiently transferring data from a server to a plurality of clients connected to the server, and an object tracking system capable of tracking the locations of a plurality of objects by acquiring, transferring and processing data concerning the location information.

2. Related Art

Object tracking technology is now widely applied in industries and to people's lives. An example of the circumstances for applying the technology is the mining industry where mine workers normally carry out the mining operation underground. In the event that a catastrophic event happens without any precaution, it is imperative to track and locate the trapped workers precisely and promptly. Whether rescue efforts can be implemented successfully depends greatly on the time it takes to acquire, transfer and process the location information of the trapped workers. Thus, it is imperative to have advanced systems, which are capable of providing highly accurate location information with little deviations in the shortest time when a catastrophic event happens.

In an object tracking system utilizing Radio Frequency Identification (RFID) technology, the data of the location information of objects is initially acquired by an RFID reader and subsequently accessed by a server. The server functions to process the data and further transfers the processed data to a plurality of clients or terminals, which monitor and track the location of the objects based on further processing of the data, if necessary.

In circumstances where there are a large amount of objects to be monitored and tracked, a large quantity of realtime data concerning the location of the objects must be transferred from the server to the clients within a short time. For example, 2,000 mine workers are monitored by the tracking system, as the monitor terminals of the system need to display the latest location information as soon as possible, the server must send the data consisting of location information of all the workers to each client within a time interval defined by the refresh time of the system, for example, 3 seconds. Therefore, in order to realize a realtime or semi-realtime monitoring of the objects, the data transferring speed between the server and the clients becomes critical to the overall object tracking system.

Accordingly, there is a need for an improved data transferring method to implement efficient transmission of a large quantity of data from a server to a plurality of clients in a realtime or semi-realtime manner.

SUMMARY OF THE INVENTION

In view of the foregoing and other problems of the conventional method, the present invention provides a data transferring method for transferring data between a server and a plurality of clients. The method comprises the steps of generating messages based on the data, connecting the clients to the server and generating event trigger thread instances which are in communication with the corresponding clients, and sending the messages from the server to the clients through remote events by using the plurality of event trigger thread instances to control the communication between the server and the clients.

In one aspect of the method, the step of connecting the clients to the server includes registering a delegate method of the clients to the server's refresh event. Preferably, sending the messages from the server to the client includes sending the messages automatically upon triggering of the server's refresh event.

In another aspect of method, the step of generating messages based on the data includes generating the messages based on the changes of the data within a certain time interval.

In yet another aspect of the method, the method further comprises packing the messages prior to sending the messages from the server to the client and unpacking the messages after the client receives the messages from the server. Preferably, the method further comprises compressing the message package prior to sending the messages from the server to the client and uncompressing the message package after the client receives the message from the server.

In still another aspect of the method, the method further comprises storing the messages in a cache before sending the messages from the server to the client.

The present invention also provides a tangible storage medium readable by a processing circuit and storing instructions for execution by the processing circuit for performing a data transferring method for transferring data between a server and a plurality of clients. The data transferring method comprises generating messages based on the data; connecting the clients to the server; generating a plurality of event trigger thread instances, each of the instances being in communication with a corresponding one of the clients respectively; and sending the messages from the server to the clients through remote events by using the plurality of event trigger thread instances to control the communication between the server and each client.

The present invention also provides an object tracking system for monitoring a plurality of objects. The system comprises a plurality of RFID tags each physically coupled with a corresponding object to be monitored for sending out wireless signals indicating the locations of the objects, at least one RFID reader for receiving the wireless signals generated by the RFID tags and converting the signals into data indicating the locations of the objects, and a data transferring system. The data transferring system includes a server for accessing the data generated by the RFID reader and generating messages based on the data, a plurality of clients for receiving the messages generated by the server and monitoring the objects based on the messages, and a microcontroller having data transferring software for transferring the data from the server to the clients. Significantly, the microcontroller having data transferring software generates a plurality of event trigger thread instances, each of the instances being in communication with a corresponding one of the clients, and sends the messages from the server to the clients through remote events by using the corresponding event trigger thread instance to control the communication between the server and the client.

Although a data transferring method will be described in connection with an object tracking system, it should be recognized that the application of the data transferring method according to the present invention is not limited to an object tracking system. Rather, the system and method is applicable to any other suitable circumstances, where an efficient data transmission of a large quantity of data from a server to a plurality of clients is required.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

The present invention now will be described in detail hereinafter with reference to the accompanying drawings, in which preferred embodiments of the invention are shown. However, this invention may be embodied in many different forms and should not be construed as limited to the embodiments set forth herein. Like numerals refer to like elements throughout.

As used herein, "data access" typically refers to software and activities related to storing, retrieving, or acting on data housed in a database or other repository. In an exemplary embodiment of the invention, data access can be figured as a logic layer of software, which enables translation of data from unstructured to structured.

As used herein, "business logic" is used to describe the functional algorithms, which implement information exchange between a database and a user interface. Mostly the term is applied to web application development where programs are separated into a 3-tier architecture with business logic referring to the mid tier.

As used herein, an "interface" defines the communication boundary between two entities, such as software, a hardware device, or a user. The term generally refers to an abstraction that an entity provides of itself to the outside. This separates the methods of external communication from internal operation, and allows it to be internally modified without affecting the way outside entities interact with it. Interface may also provide a means of translation between entities, which do not speak the same language, such as between a human and a computer. The interface between a human and a computer is called a user interface. Interfaces between hardware components are physical interfaces.

As used herein, "triggers" are widely used in event-driven programming or event-based programming, a computer-programming paradigm in which the flow of the program is determined by user actions (mouse clicking, key pressing) or messages from other programs. In contrast, in batch programming, the flow is determined by the programmer. Batch programming is the style taught in beginning programming classes while event-driven programming is what is needed in any interactive program. Event-driven programs can be written in any language.

As used herein, a "client" is an application or system that accesses a (remote) service on another computer system known as a server by way of a network. In an exemplary embodiment of the invention, the client of the system could be a PC or mobile device that enables running the client software.

Figure 1:
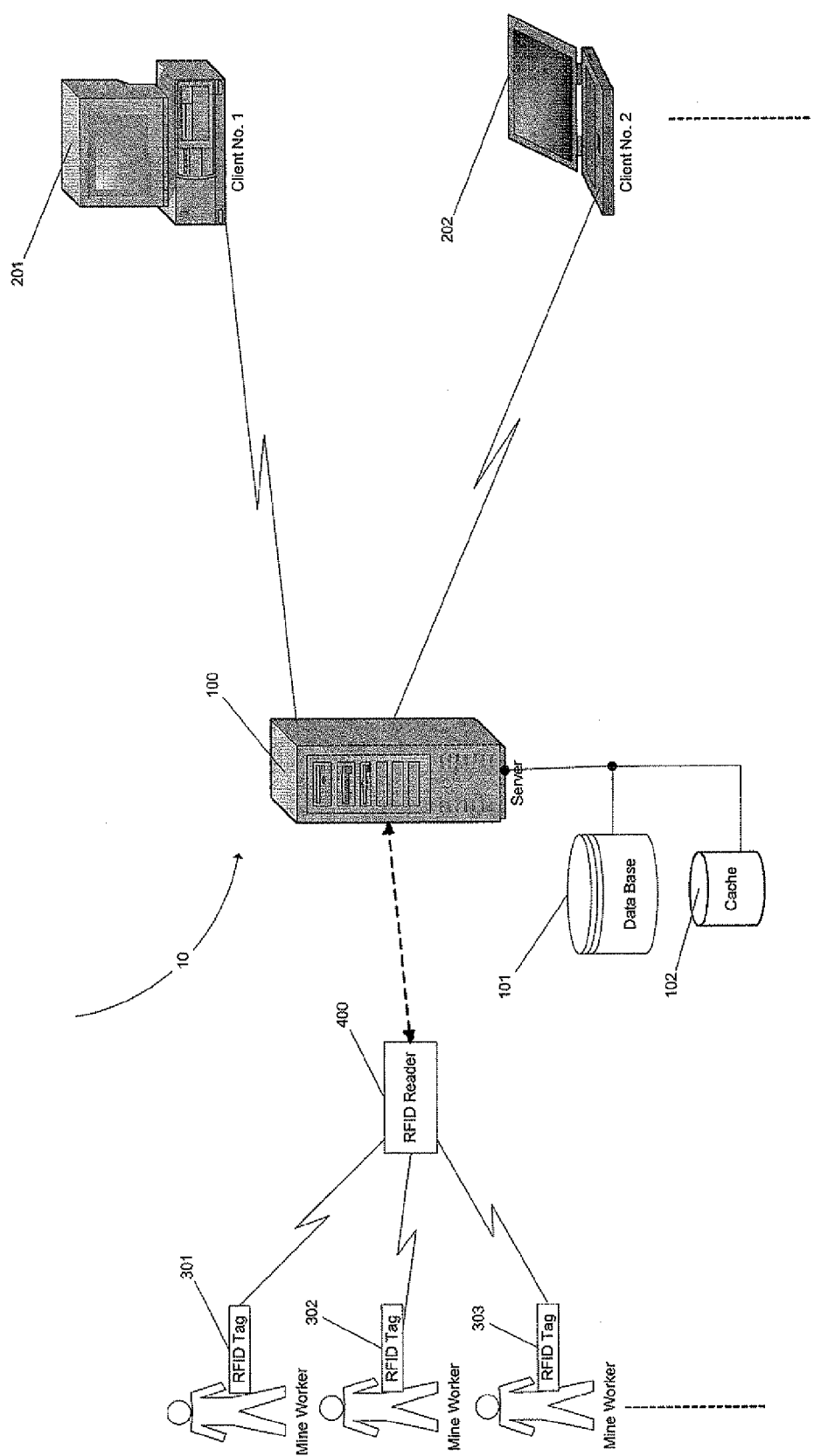
FIG. 1 is a schematic view of an object tracking system using the data transferring method according to one embodiment of the present invention.

FIG. 1 illustrates an object tracking system using the data transferring method according to one embodiment of the present invention. For example, the tracking system is described under the circumstance where a plurality of underground mine workers are being tracked and monitored by providing the location information of the workers to computer hardware which displays and processes the information. However, it is readily understood by a person of ordinary skill in the art that the tracking system is applicable to monitor any other suitable moving or immobile objects.

RFID technology is a well-know technology, often used for keeping track of large numbers of objects, especially moving objects. In this object tracking system 10, each mine worker is provided with an RFID tag, which is physically attached to the mine workers. The total number of the mine workers and the RFID tags can be up to several thousands, depending on the conditions of the mine and the operation. As illustrated in FIG. 1, RFID tags 301-303 send out wireless signals, which are in turn received by an RFID reader 400. A server 100, functioning to convert the signal into computer-readable data indicating the location information of the mine workers, is connected to the RFID reader either through wireless protocol or through hardware, such as optical fibers.

Preferably, server 100 includes a data base 101 for storing basic information of the mine workers. Data based 101 can be connected to server 100, externally or internally. For example, data base 101 stores information of the name and ID number of the mine workers, which is accessible during the processing of the acquired information. A cache 102 may also be provided to temporarily store the information during the operation of the system.

A plurality of clients are connected to the server through wireless protocol. The clients of the system can be of any suitable form to display and/or analyze the location information of the objects. For example, Client No. 1 could be a personal computer 201 and Client No. 2 could be a laptop 202. The different clients may be utilized to implement different functionalities. Further, the clients may have different authority levels to access different data. For example, laptop 202 may display an electronic map system detailing the geographic structure of the mine and the data transmitted from server 100 is ultimately processed to illustrate a spot embedded in the map to indicate the specific location of a mine worker.

During the operation of the object tracking system, RFID reader 400 collects information relative to the current location of the mine workers from RFID tags 301-303 based on a regular time interval, and the acquired information is subsequently transferred to server 100 for any necessary processing. The processed data is finally transferred from server 100 to clients 201 and 202, for displaying the location of the mine workers and/or further processing of the data. In order to realize the controlling of the information in a realtime or semi-realtime manner, the time interval for collecting information by the RFID reader should be shortened as much as possible. Accordingly, a large quantity of data would be generated by server 100. This time interval is identified as the refresh time limit of the system. In this object tracking system 10, it is assumed that the refresh time limit of 3 seconds is acceptable to implement a realtime or semi-realtime system.

Figure 2:
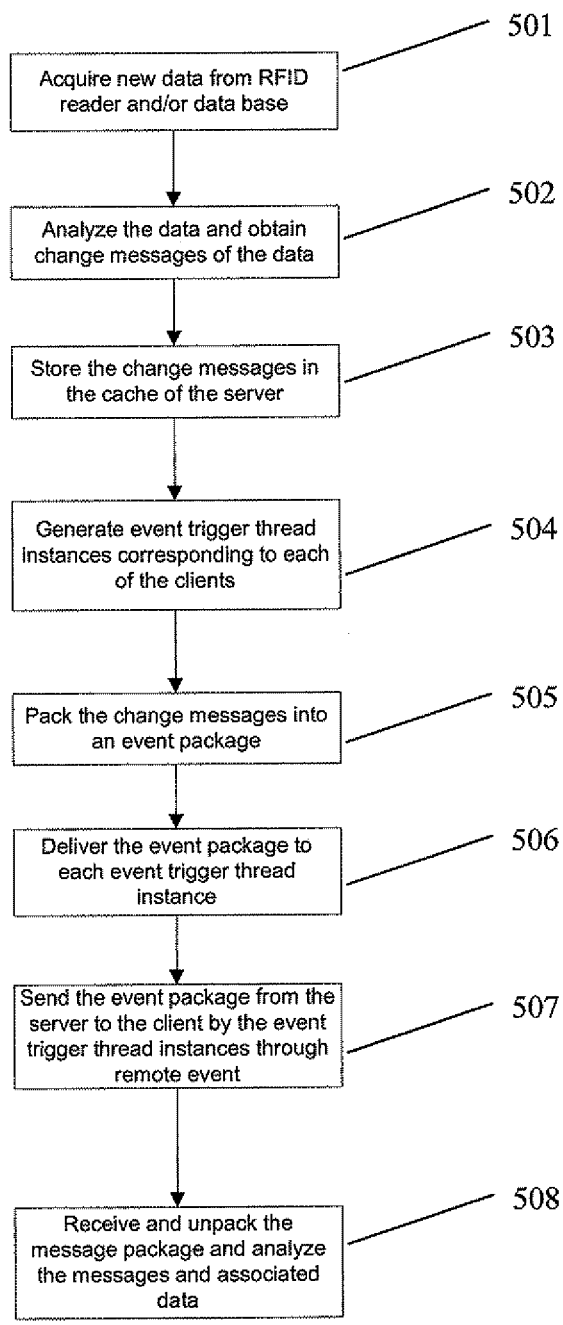
FIG. 2 is a flow chart illustrating the steps of the data transferring method according to the embodiment of the present invention.

FIG. 2 is a flow chart illustrating the steps of the data transferring method according to one embodiment of the present invention wherein a plurality of event trigger thread instances are generated and data messages are sent from the server to each client through a corresponding one of the event trigger thread instances which exclusively communicates with the client. Although FIG. 2 shows steps 501-508 of the method, it should be recognized that not all the steps are necessary to implement the data transferring method.

The method according to one embodiment of the present invention will be described in connection with FIG. 2 and FIGS. 3-7. FIGS. 3-7 are architectural diagrams of the software systems embodying a traditional data transferring method and the data transferring method according to an embodiment of the present invention, respectively.

The architecture of a software system embodying data transferring method according to one embodiment of the present invention is based on .Net framework, so the Remoting technology using TCP (Transmission Control Protocol) channel is chosen to transfer data between server and clients as it is more efficient for allowing programs to interact in a LAN system.

At step 501, server 100 acquires new data from RFID reader 400 and/or database 101.

At step 502, server 100 analyzes the acquired data indicating the location information of the mine workers and generates a change message based on comparison of the current data and the previously acquired data. By sending the change messages from the server to the clients, the data transferring system is able to effectively decrease the quantity of data to be transferred. At step 503, the change messages generated at step 502 are stored in a cache 102 of server 100. Steps 502 and 503 will be described in detail with reference to FIGS. 3 and 4.

Figure 3:
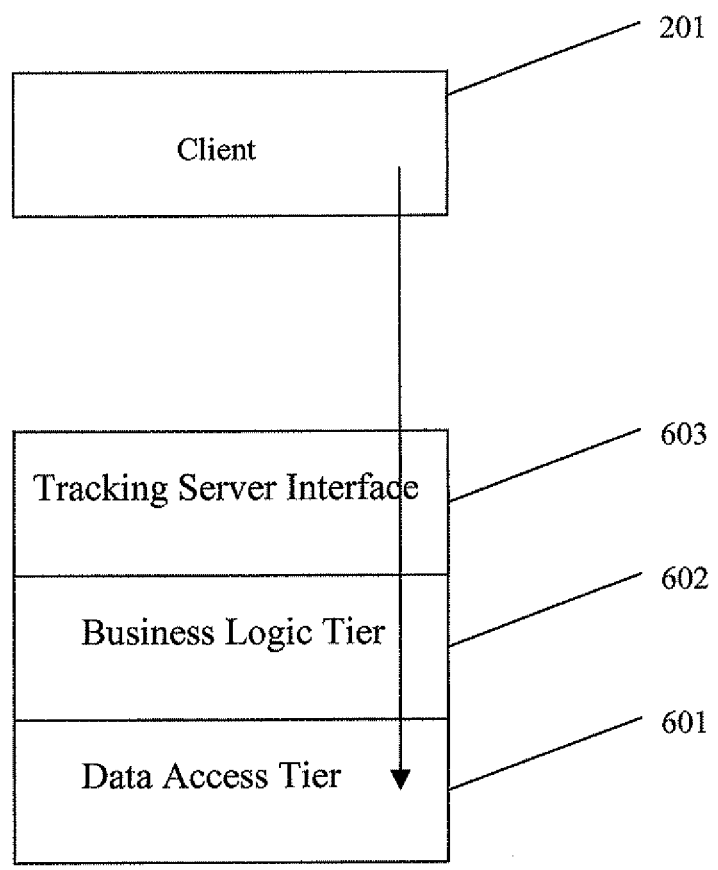
FIG. 3 is an architectural diagram of the software system embodying a traditional data transferring method.

FIG. 3 is an architectural diagram of the software system embodying a traditional data transferring system and method. As illustrated in FIG. 3, the software system includes a data access tier 601, a business logic tier 602 and a tracking server interface 603. Client 201 retrieves current data from the server by directly accessing data access tier 601 within every regular time interval and displays the data on the UI (User Interface) of the clients. The disadvantage of this method is that the data retrieval will engross most of the CPU capacity. Another disadvantage is that too much time is consumed for the data retrieval and the UI could be blocked when refreshing a large number of information entries on the UI, which could create a bottle-neck of the whole system.

Figure 4:
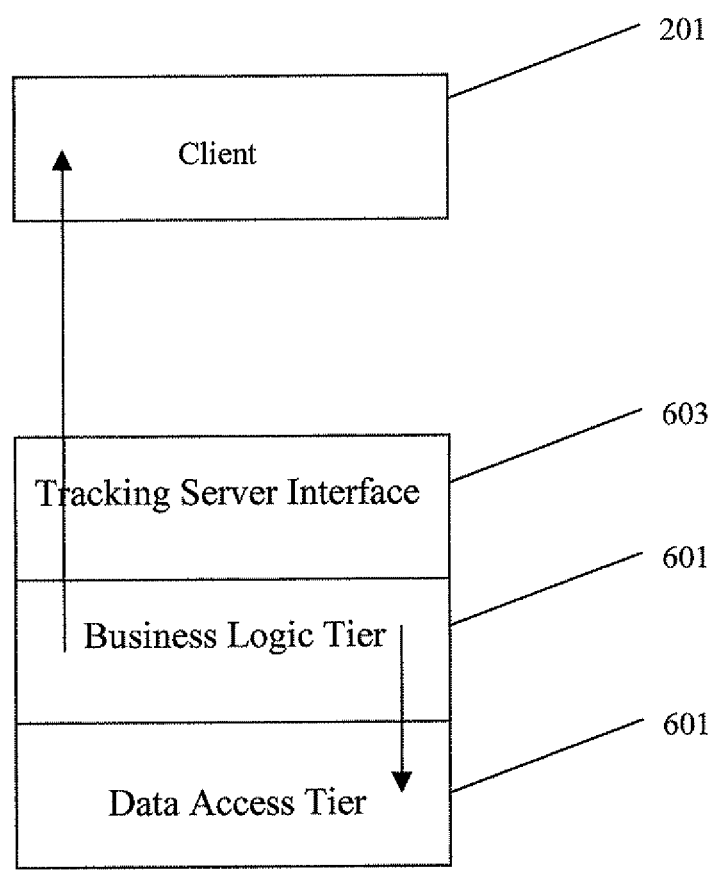
FIG. 4 is an architectural diagram of the software system embodying the data transferring method according to the embodiment of the present invention, wherein newly obtained data is compared with previously obtained data and the changes of the data are transferred from the server to the clients.

FIG. 4 is an architectural diagram of the software system embodying the data transferring method of one embodiment of the present invention, wherein the clients do not directly retrieve the current data from the server and instead change messages are generated based on the comparison of the current data and the previous data. As illustrated by FIG. 4, client 201 directly accesses business logic tier 602 to retrieve the change messages instead of the current data. By sending only the changes of the data, the system reduces the data to be sent effectively. Cache 102 is incorporated into the system for storing the data. For each data transmission, the server obtains new data from the RFID reader and/or the database, and compares the new data with the previous data stored in the cache. In the event that it is determined that the data has been changed, for example, the name or position of a mine worker, the server will notify the clients to update their UI. Thus, the server only needs to transfer the changed data to the clients and, accordingly, the net load of the system is lowered.

Referring back to FIG. 2, at step 504, a plurality of event trigger thread instances are generated, each of which corresponds to a single client. At step 505, the change messages are packed into an event package before being delivered to the event trigger thread instances, for further improving the efficiency of the data transmission. At step 506, the event package is delivered to each event trigger thread instances and at step 507, the event package is sent in parallel from each of the event trigger thread instances to a corresponding client through the remote event. At step 508, each of the clients receives the message package and unpacks the package, and subsequently analyzes the associated data of the messages. Steps 504-508 will be described in detail with reference to FIGS. 5-7.

Figure 5:
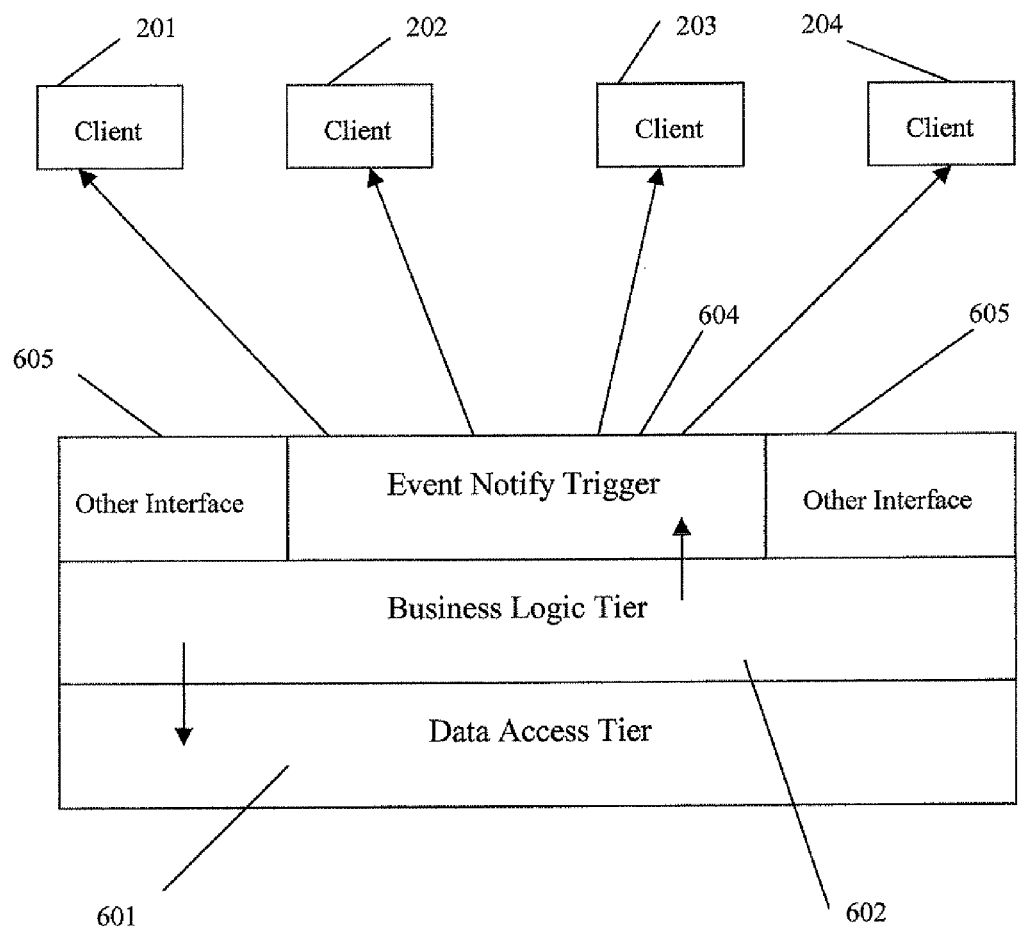
FIG. 5 is a another architectural diagram of the software system embodying the data transferring method according to the embodiment of the present invention, wherein a remote event technology is used to implement the data transmission.

FIG. 5 is another architectural diagram of the software system embodying the data transferring method of one embodiment of the present invention, wherein a remote event technology is used to implement the data transmission. Remote event technology through TCP channel is applied for the server to notify the clients. By means of the remote event technology, the clients only need to connect to the server and register their delegate methods with the server's refresh event. The server will be responsible to identify the changes of the data and further sent the changes to all the registered clients as remote events, which means the clients do not obtain data on their own initiatives and the transmission of useless messages can be avoided. As illustrated in FIG. 5, tracking server interface 603 includes an event notify trigger 604 and other interfaces 605. Four clients 201-204 are in communication with event notify trigger 604 to retrieve data change messages through remote event technology.

Figure 6:
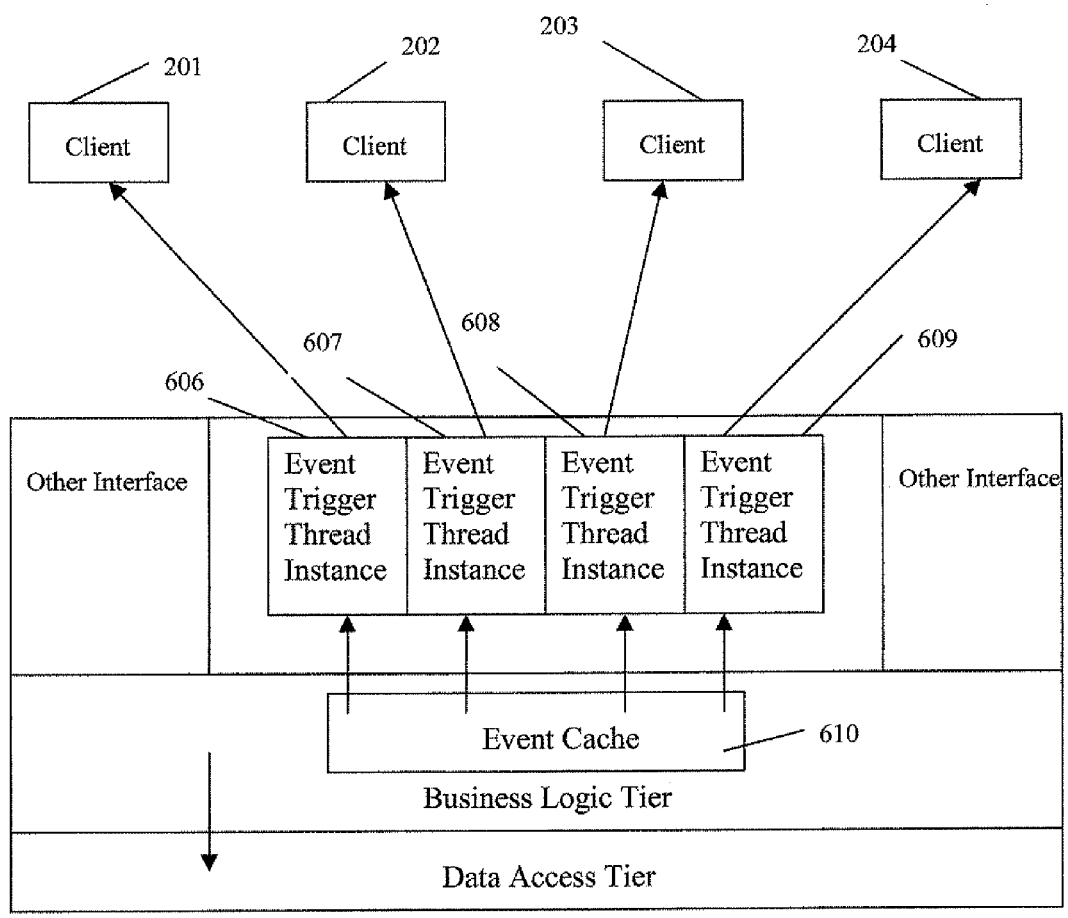
FIG. 6 is a another architectural diagram of the software system embodying the data transferring method according to the embodiment of the present invention, wherein a plurality of event trigger thread instances are generated and in communication with corresponding clients.

FIG. 6 is a another architectural diagram of the software system embodying the data transferring system and method according to one embodiment of the present invention, wherein a plurality of event trigger thread instances are generated and in communication exclusively with corresponding clients. If the server sends a message to all the clients through a single event rigger, as shown in FIG. 5, the delegate methods in event's delegate list is invoked one by one, which means the server will wait for a client's delegate method being completed and then invoke the next delegate method in a serial manner. This results in an issue that the clients' performance will impact the server and the other clients, which is not acceptable. As illustrated in FIG. 6, a plurality of event trigger thread instances 606-609 are generated as subtiers of tracking server interface 603. Each of clients 201-204 is in communication exclusively with a single event trigger thread instance. For example, client 201 is in communication exclusively with event trigger thread instance 606. Thus, the communication between client 201 and event trigger thread instance 606 will not affect the communication between other clients and event trigger thread instances. In addition, business logic tier 602 includes an event cache 601 as a subtier, which is in communication with event trigger thread instances 606-609.

Traditionally, a thread pool is involved to manage the clients. However, it is recognized that the thread pool will be filled to reach its capacity easily in light of the large amount of messages, which results in message blockage.

Hence, this problem is solved by managing the clients in separate exclusive threads. The server builds a cache to store all messages. Whenever a client is connected to the server, the server generates one thread to exclusively manage and control the communication between the server the specific client. The software system may further incorporate a data analysis logic, which functions to compare the data and generate the messages to be stored in the cache. The server sends the messages stored in the cache to each event trigger thread instance and the event trigger thread instance further sends the messages to a corresponding client. Therefore, one event trigger thread instance is generated for each client, and the communication between the event trigger thread instance and the client should be maintained before the client is disconnected from the event trigger thread instance.

Figure 7:
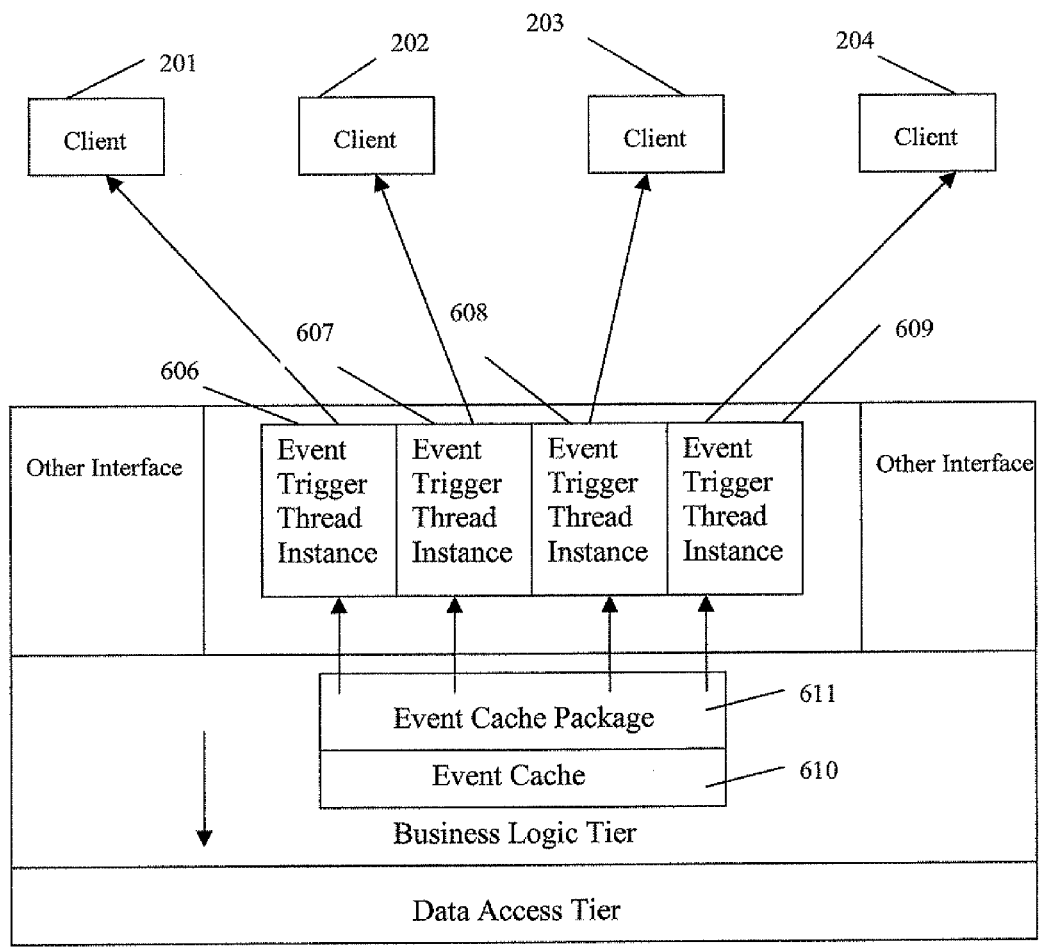
FIG. 7 is a another architectural diagram of the software system embodying the data transferring method according to the embodiment of the present invention, wherein a plurality of event trigger thread instances are connected to corresponding clients, the messages are stored in an event cache and the messages are packed into a message package before being sent.

In order to further improve the efficiency of the data transmission, the change messages of the data can be packed before being sent to the clients. As shown in FIG. 7, business logic tier 602 further includes an event cache package 611 as a subtier, which functions to pack the change messages stored in the cache into a message package before being sent. Event trigger thread instances 606-609 are in communication with even cache package 611, to send the message package to clients 201-204 upon the requests of the clients. Assuming that 5,000 messages need to be sent to all the clients, if all the messages generated during a time interval are packed into a package, only one event package need to be sent to the client every time. After the clients receive the event package, the package is unpacked and the messages of the package are accessed by the clients. In addition, the event package can be compressed before being sent, to further optimize the data transmission.

The following tables show the testing results of the data transferring system and method according to the present invention as applied to a Honeywell People Tracking System (HPTS). Table 1 shows the transferring time in terms of different clients number, when 1000 objects are tracked and monitored. Table 2 shows the transferring time in terms of different amount of objects, when 4 clients are employed in the system.

TABLE 1

| | Client NO. | | | |
|---|---|---|---|---|
| | 2 | 4 | 6 | 8 |
| Transferring Time (ms) | 187 | 327 | 958 | 1771 |

TABLE 2

| | Objects No. | | | |
|---|---|---|---|---|
| | 200 | 1000 | 2000 | 6000 |
| Transferring Time (ms) | 60 | 327 | 959 | 952 |

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. An object tracking system for monitoring a plurality of objects, comprising:
   a plurality of RFID tags each physically coupled with a corresponding object, that send out wireless signals indicating the locations of the objects;
   at least one RFID reader that receives the wireless signals generated by the RFID tags and converts the signals into object-tracked data indicating the locations of the objects; and a data transferring system including:
   a server that accesses the object-tracked data generated by the RFID reader and that generates messages based on a comparison of currently obtained object-tracked data and previously obtained object-tracked data;
   a plurality of clients that receive the messages generated by the server, the server configured to monitor the locations of each of the objects in real time based on the messages where each of the plurality of objects and the server must send location information to each client of the plurality of clients within a time interval defined by a refresh time of the system; and
   a microcontroller having data transferring software for transferring the data from the server to the clients, wherein the microcontroller has data transferring software that generates a plurality of event trigger thread instances, each of the instances being in communication with a corresponding one of the clients, and sends the messages from the server to the clients through remote events by using the corresponding event trigger thread instance to control the communication between the server and the client but only for those objects whose location has changed.

2. The object tracking system of claim 1, wherein the microcontroller having data transferring software registers a delegate method of the clients to the server's refresh event and sends the messages automatically upon triggering the refresh event of the server.

3. The object tracking system of claim 1, wherein generating messages based on the comparison of the currently obtained object-tracked data and the previously obtained object-tracked data includes generating the messages based on the comparison within a certain time interval.

4. The object tracking system of claim 1, furthering comprising packing the messages prior to sending the messages from the server to the client and unpacking the messages after sending the messages from the server to the client.

5. The object tracking system of claim 4, further comprising compressing the message package prior to sending the messages from the server to the client and uncompressing the message package after sending the messages from the server to the client.

6. The object tracking system of claim 1, further comprising storing the messages in a cache before sending the messages from the server to the client.

* * * * *